United States Patent [19]
Jeuniaux et al.

[11] Patent Number: 5,557,100
[45] Date of Patent: Sep. 17, 1996

[54] FLATNESS-MEASURING ROLLER FOR A CONTINUOUSLY MANUFACTURED STRIP BY ANALYZING THE BIREFRINGENCE CAUSED BY THE APPLICATION OF LATERAL FORCE TO AN OPTICAL FIBER WRAPPED AROUND THE ROLLER

[75] Inventors: François Jeuniaux, Sancy; Jean-Luc Mineau, Metz, both of France

[73] Assignee: Sollac, Puteaux, France

[21] Appl. No.: 561,119

[22] Filed: Nov. 20, 1995

Related U.S. Application Data

[63] Continuation of Ser. No. 244,207, filed as PCT/FR92/01128, Dec. 2, 1992, published as WO93/11404, Jun. 10, 1993, abandoned.

[30] Foreign Application Priority Data

Dec. 2, 1991 [FR] France .................... 91 14912

[51] Int. Cl.⁶ .................................................. G01J 1/04
[52] U.S. Cl. .................. 250/227.16; 250/227.17; 356/32; 356/365; 356/371
[58] Field of Search ............... 250/227.17, 225, 250/227.16; 356/365, 371, 32; 324/94

[56] References Cited

U.S. PATENT DOCUMENTS

| | | | |
|---|---|---|---|
| 4,173,412 | 11/1979 | Ramsay et al. | 356/33 |
| 4,300,403 | 11/1981 | Berger et al. | 73/862.07 |
| 4,866,266 | 9/1989 | Calvani et al. | 250/227.17 |
| 4,970,385 | 11/1990 | Tatsuno et al. | 250/227.17 |
| 5,061,847 | 10/1991 | Hazan et al. | 250/227.17 |
| 5,064,270 | 11/1991 | Turpin et al. | 350/96.29 |
| 5,218,197 | 6/1993 | Carroll | 250/227.19 |
| 5,308,973 | 5/1994 | Odoni et al. | 250/227.17 |

*Primary Examiner*—Edward P. Westin
*Assistant Examiner*—Stephen Calogero
*Attorney, Agent, or Firm*—Oblon, Spivak, McClelland, Maier & Neustadt, P.C.

[57] ABSTRACT

A roller is rotatably mounted about its axis and comprises a hollow, cylindrical roll face, a ring and two hollow shafts. The roller is provided with a force measuring fiber optical device which uses the double refraction in an optical fiber subjected to a lateral force. The optical fibers of the measuring device form coils, each having at least one turn and the cylindrical roll face.

11 Claims, 2 Drawing Sheets

FLATNESS-MEASURING ROLLER FOR A CONTINUOUSLY MANUFACTURED STRIP BY ANALYZING THE BIREFRINGENCE CAUSED BY THE APPLICATION OF LATERAL FORCE TO AN OPTICAL FIBER WRAPPED AROUND THE ROLLER

This application is a Continuation of application Ser. No. 08/244,207 filed on Jul. 28, 1994, now abandoned which was filed as PCT application PCT/FR92/01128 on Dec. 2, 1992 and published as WO93/11404 on Jun. 10, 1993.

BACKGROUND OF THE INVENTION

The invention relates to flatness-measuring rollers for a continuously produced strip, for example a steel strip.

DISCUSSION OF THE BACKGROUND

In continuous strip manufacturing lines it is necessary to be able to check the flatness continuously. This is the case, for example, in steel strip cold-rolling mills.

Flatness defects often result from differences in length between the axial fibers and the lateral fibers, which lead either to undulations in the margins or to voids in the axis.

In order to detect and measure these defects the strip is subjected to tension by making it bear on a deflector roller, and the pressure of the strip on the roller is measured, in the axis of the strip and in the margins. In fact, the short fibers and the long fibers do not undergo the same tension, and that being so, do not exert the same pressure on the roller.

In order to perform this flatness check, flatness-measuring rollers exist comprising a jacket, a surface and journals, the surface being equipped with pressure sensors of the piezoelectric or inductive type. They are mounted rotatably about their axis. This is the case particularly for the flatness measuring roller described in the document U.S. Pat. No. 4,428,244. This is the case particularly for the flatness-measuring roller described in the document U.S. Pat. No. 4,428,244. However, these rollers have several drawbacks:

- they are mechanically very complex and very heavy, which necessitates a considerable infrastructure for installing them; a motor is necessary, in particular,
- they are very expensive,
- the piezoelectric or inductive sensors are relatively bulky, which does not make it possible to place many of them along a generatrix of a roller, and that reduces the resolution in width,
- the generation and the transmission of the measurement are complex, the thickness of the strip checked.

SUMMARY OF THE INVENTION

The object of the present invention is to propose a flatness-measuring roller which is mechanically simple, which is light and has no need of being motor-driven, which has a good resolution in width, for which the generation and the transmission of the measurement are simple and which is such that the measurement is independent of the rigidity or of the thickness of the strip.

To this end, the subject of the invention is a roller measuring flatness of a continuously produced strip, for example a steel strip, of the type comprising a hollow cylindrical surface, a jacket and two hollow journals, further comprising a force-measuring device with optical fibers using the birefringence appearing in a monomode optical fiber subjected to a lateral force, the optical fiber or fibers of the force-measuring device forming at least one winding with at least one turn about the cylindrical surface, placed in contact with the jacket in such a way as to be subjected to the mechanical stress generated by the pressure of the strip on the jacket.

The optical-fiber force-measuring device comprises a stabilized electrical power supply, a monochromatic light source, a polarizer and at least one monomode optical fiber, a polarimetric analyser, a photodetector and an electronic phase-tracker device, which are arranged inside the cylindrical surface.

For preference, the force-measuring device equipping the roller comprises a plurality of optical fibers mounted in parallel and forming windings around the cylindrical surface which are spaced by at least one turn and distributed over the width of the surface.

For preference, the light source is a laser source.

The electronic phase-tracker devices are connected to a multiplexer placed inside the cylindrical surface.

The multiplexer feeds a photodiode placed in the axis of the roller in proximity to the outer end of a journal.

The roller possibly includes at least one coupler to which a plurality of optical fibers are connected.

It includes a stabilized electrical power supply device connected, on the one hand, to conducting rings placed on one of the journals and, on the other hand, to the light source or sources.

For preference, the jacket is made of synthetic material, for example a resin.

Such a roller is light, has no need of being motor-driven, has a good resolution in width and is not sensitive to the thickness or to the rigidity of the strip. Moreover, it is economical.

Advantageously, in order to be able to correct the force measurements for the possible variable effects of temperature across the width of the rolled strip, the roller according to the invention incorporates, in the vicinity of the optical-fiber windings of the force measurer, a secondary winding of at least one turn also consisting of an optical fiber using the birefringence appearing when it is subjected to a temperature variation, the said secondary winding being arranged in such a way as not to be subjected to the mechanical stresses generated by the pressure of the strip on the jacket.

BRIEF DESCRIPTION OF THE DRAWINGS

The invention will now be described in more detail with respect to the following drawings, in which.

DESCRIPTION OF THE PREFERRED EMBODIMENTS

Figure 2:
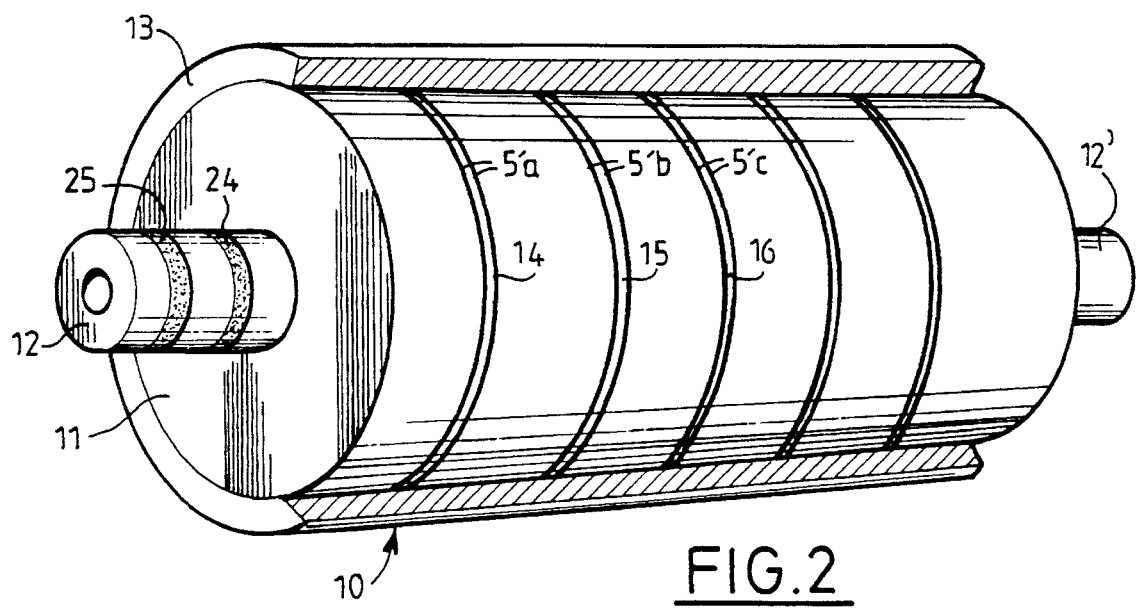
FIG. 2 is a view in perspective of a roller according to the invention with partial cutaway of the jacket.
Figure 3:
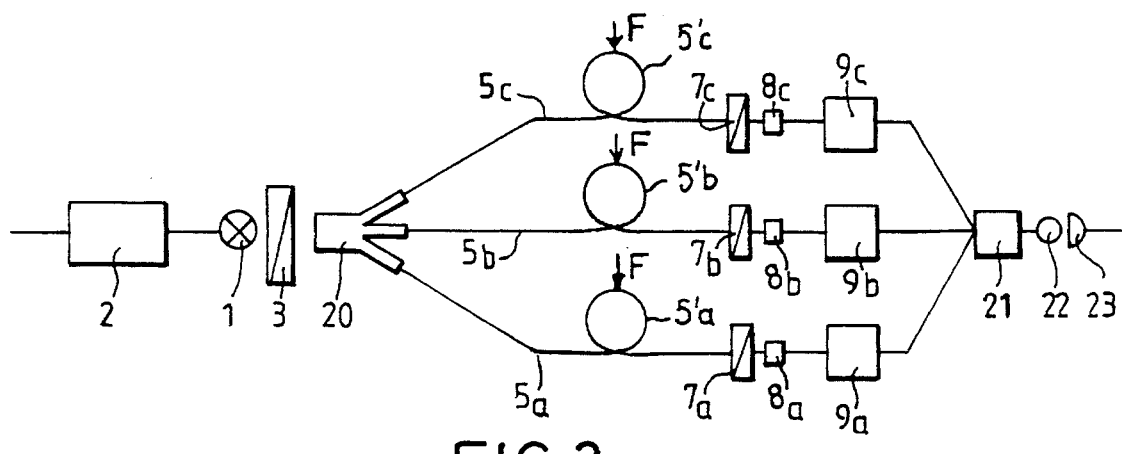
FIG. 3 is a diagram for mounting three fibers in parallel fed by a single light source.

FIG. 2 is a view in perspective of a roller according to the invention with partial cutaway of the jacket, FIG. 3 is a diagram for mounting three fibers in parallel fed by a single light source.

Figure 4:
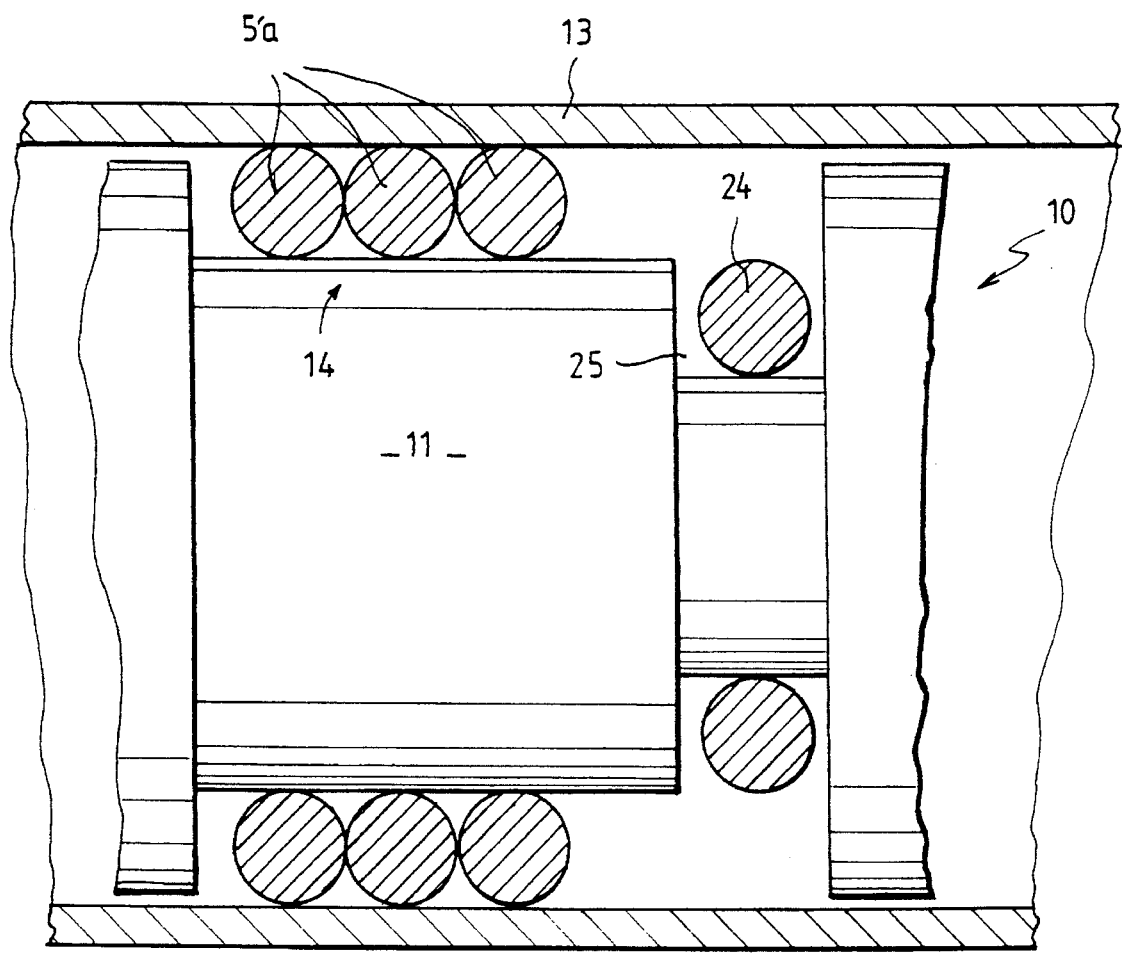
FIG. 4 is a partial diagrammatic view in longitudinal section along the axis of the roller of an advantageous embodiment of the invention providing temperature correction.

FIG. 4 is a partial diagrammatic view in longitudinal section along the axis of the roller of an advantageous embodiment of the invention providing temperature correction.

The principle of force measurement by optical fiber is known, for example, from the document GB-A-1.544.483, but it will be described for greater clarity in the description.

When a monomode optical fiber is subjected to a lateral force, a birefringence appears. From this birefringence, it results that the light waves polarized parallel to the axis of the force do not propagate at the same speed as the waves polarized perpendicularly to the axis of the force.

If, in a monomode optical fiber subjected to a lateral force, a wave polarized at 45° with respect to the axis of the force is introduced, the wave breaks down into two waves polarized linearly respectively parallel to the direction of the force and perpendicularly to this same direction. These two waves propagate in the fiber with different speeds. If the two waves are superimposed at the exit from the fiber, with the aid of a polarimetric analyser, interference is observed.

If the force is varied, a succession of interference fringes is seen to appear. By counting the interference fringes, it is possible to follow the changing pattern of the force and to determine its value.

Figure 1:
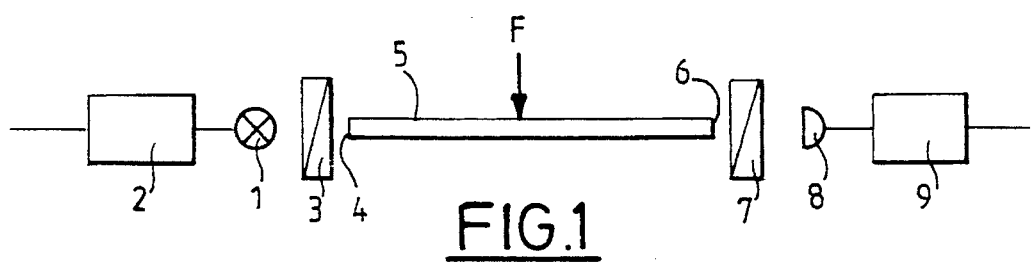
FIG. 1 is a theoretical diagram of an optical-fiber force sensor.

In order to implement this method, a device is used the principle of which is represented in FIG. 1.

Such a flatness-measuring roller, identified generally by 10 in FIG. 2, includes a continuous hollow cylindrical surface 11, hollow journals 12, 12' and a jacket 13. On the cylindrical surface 11 are wound a plurality of optical fibers 5a, 5b, 5c (FIG. 3) forming one or more loops 5'a, 5'b, 5'c constituting spaced windings 14, 15, 16, (FIG. 2) distributed over the width of the surface 11. Each optical fiber forms a least one turn and can form several contiguous turns. The ends of each optical fiber penetrate inside the cylindrical surface in which are placed a power supply, one or more light sources, polarizers, polarimetric analysers, photodetectors and electronic phase-tracker devices.

Each optical fiber is integrated into an optical circuit comprising a laser light source and a polarizer at one end of the fiber, a polarimetric analyser, a photodetector and an electronic phase-tracker device at the other end of the fiber.

The electronic phase-tracker devices, known in themselves, are linked to a multiplexer 21. The multiplexer is placed within the roller. It is linked to a light-emitting diode 22 placed in the axis of a hollow journal in proximity to the outer end of the journal. Outside the roller, a photodetector 23 is placed in the extension of the axis of the roller, opposite the light-emitting diode 22. The photodetector 23 is linked to an electronic signal-processing and calculating device, not represented.

In the case in which there is only one optical fiber, the light-emitting diode is linked directly to the phase-tracker device.

As shown in FIG. 3, the stabilized power supply 2 is linked to two conducting rings 24 and 25 situated at the periphery of a journal 12. Several optical fibers can be supplied with light by a single light source 1 as represented in FIG. 3. In this case, behind the polarizer 3 a coupler 20 is installed, which divides the light bee originating from the source 1 and polarized by the polarizer 3 into as many polarized beams as there are fibers. The coupler 20 has to be a polarization-preserving coupler. In the case of FIG. 3, the coupler 20 feeds three fibers 5a, 5b, 5c which serve as detectors and which each form one or more loops 5'a, 5'b or 5'c around the surface of a cylinder, on which a transverse force F is exerted. It is also possible to place three polarizers after the coupler 20.

Each fiber is equipped with a polarimetric analyser 7a, 7b, 7c and with a photodetector 8a, 8b, 8c which feeds a phase-tracker device 9a, 9b, 9c; the various phase-tracker devices are connected to a multiplexer 21. It will be noted that all the polarimetric functions can be carried out with matched optical fibers.

As shown in FIG. 2, the windings 14, 15, 16 are arranged on the roller in such a way that the optical fibers have a good lateral resolution. In order to do that, the fibers can be placed relatively close to one another, particularly in the regions lying close to the ends of the roller.

In order to protect the optical fibers from the harm which contact with the strip would cause, the surface of the roller is coated with resin. This coating forms a jacket 13.

The operation will now be described. Via the rings 24 and 25, the stabilized power supply 2 is fed with electrical current; it delivers a stabilized current which feeds the monochromatic light source 1. The light source 1 emits a light ray which is polarized by passing through the polarizer 3. The polarized light ray is divided by the coupler 20 into as many light rays as there are fibers connected to the coupler. Each optical fiber 5a, 5b, 5c receives a light beam which is affected by the force F to which the optical fiber is subjected. The light beam of each optical fiber is analysed by the polarimetric analyser 7a, 7b, 7c associated with each optical fiber, and each light signal emitted by each polarimetric analyser is detected by the photodetectors 8a, 8b, 8c which convert the light signals into electrical signals. Each electrical signal is processed by the associated phase-tracker devices 9a, 9b, 9c. These phase-tracker devices send a signal to the multiplexer 21 which feeds the light-emitting diode 22. The latter sends a light signal out of the roller. This signal is detected by the photodiode 23 situated outside the roller. The photodiode 23 sends the signal to the electronic processing and calculating device. It is thus possible to know the force F which is exerted on each of the fibers.

It should be noted that not all the optical fibers of the roller are necessarily fed with light by the same light source, there may be several light sources. In contrast, all the phase-tracker devices are connected to a single multiplexer. In effect there is a single signal output out from the roller.

The output of the signal by means of the light-emitting diode 22 and of the photodetector 23 has the advantage of being much more reliable than the outputs by means of conducting rings.

Finally, on a manufacturing line, the roller is mounted rotatably about its axis which is parallel to the surface of the strip. It is mounted in such a way that it performs a certain deflection of the strip so that the latter exerts a force on the roller.

It will be noted that such a roller is insensitive to the rigidity or to the thickness of the strip. In fact, the force measured is independent of the angle of winding of the strip on the roller, which is not the case in rollers according to the prior art, and the angle of winding depends on the rigidity and on the thickness of the strip.

The monomode optical fibers used in the construction of the force-measuring device which has just been described are sensitive to heat in the same way.

Thus, if the temperature of the strip is not transversely uniform (for example edges cooler than the mid part) the signals delivered by the various optical fibers will be affected by the temperature differences and will therefore not be perfectly representative of the real flatness defects when the strip is at a uniform ambient temperature.

In order to remedy this possible drawback, it is possible advantageously to arrange, in the vicinity of each optical-fiber winding of the force measurer, a secondary winding of the same type, that is to say a temperature sensor consisting of a monomode optical fiber which uses birefringence along two directions at 90°, appearing under the effect of a temperature variation, this winding being arranged in such a way that the fiber which constitutes it is not subjected to the mechanical stress caused by the pressure of the rolled strip on the jacket of the roller.

As shown in FIG. 4, in which only the portion of the roller 10 containing the winding 14 has been represented, in order not to overburden the figure needlessly, this particular embodiment of the invention can be carried out by housing the optical fiber, which is to form the temperature-sensor secondary winding 24, in a channel 25 formed by machining, on the surface 11, deeper than the housing reserved for the main winding 14. The machining depth is determined, as will be understood, in such a way that the optical fiber constituting the secondary winding 24, having regard to its diameter, is not placed in contact with the jacket 13.

The temperature measurement, with the aid of an optical fiber such as 24, sensitive to the temperature but not sensitive to the stress, can be done by an interfero-polarimetric technique, as for the force-sensor device which was described previously.

As shown in FIGS. 2 and 4, this method amounts to installing a network of monomode, optical-fiber temperature sensors, such as 24, in parallel with the force-sensor network 14, 15, 16, etc., distributed along the roller 10. These temperature sensors 24, etc., each associated with a neighboring force sensor, are included in an optical layout which is identical to that in which the force-measuring optical fibers 5a, 5b, 5c, etc. are mounted, namely a monochromatic light source, for example a laser, a polarizer, and at least one temperature-sensitive monomode optical fiber, a polarimetric analyser, a photodetector and an electronic phase-tracker device.

These optical fibers 24 thus arranged deliver a signal which is representative of the local temperature. This signal is used to correct the signal from the neighboring optical fiber sensing the force and thus to obtain stress values which are not disturbed by the temperature gradients which the rolled strip may exhibit over its width. Moreover, by virtue of a central computer, it is easy, from each pair of force-temperature values, to determine the flatness profile which the strip will exhibit once it has reached the ambient temperature of 20° C.

What is claimed is:

1. A roller for measuring the flatness of a continuously produced strip, the roller being rotatably mounted about its axis, the roller comprising:

a hollow cylindrical continuous surface, a jacket and two hollow journals;

a force-measuring device having at least one optical fiber using the birefingence appearing in a monomode optical fiber subjected to a lateral force, said at least one optical fiber forming at least one winding with at least one turn which is continuous about the cylindrical surface, and being placed in contact with the jacket in such a way as to be subjected to a mechanical stress generated by a pressure of the strip on the jacket.

2. A roller according to claim 1, wherein the force measuring device comprises, adjacent to the cylindrical surface:

a stabilized electrical power supply;

a monochromatic light source connected to the stabilized electrical power supply for being supplied with electric current and for producing light;

a polarizer placed for receiving light from the light source and producing polarized light; and at least one monomode optical fiber having an inlet end for receiving the polarized light from the polarizer and an outlet end; and arranged inside the cylindrical surface:

a polarimetric analyzer placed for receiving light from the outlet end of the optical fiber;

a photodetector connected to said polarimetric analyzer; and an electronic phase-tracker device connected to said photodetector.

3. A roller according to either of claims 1 or 2, wherein the force-measuring device comprises a plurality of optical fibers mounted in parallel and forming a plurality of windings around the cylindrical surface which are spaced and distributed over a length of the cylindrical surface in an axial direction.

4. A roller according to claim 2, wherein the light source is a laser source.

5. A roller according to claim 3, having for each optical fiber of the said plurality of optical fibers a phase-tracking device and further including a multiplexer placed inside the cylindrical surface connected to each of the phase-tracking device.

6. A roller according to claim 2, including a photodiode which can receive a signal from the electronic phase-traker device, said photodiode being placed in the axis of the roller in proximity to an outer end of one of said two hollow journals.

7. A roller according to claim 3, including at least one optical coupler to which an inlet end of each fiber of said plurality of optical fibers is connected.

8. A roller according to claim 2, wherein one of the hollow journals includes conducting rings connected to the stabilized electrical power supply.

9. A roller according to claim 1, wherein the jacket is made of synthetic material.

10. A roller according to claim 1, including in a vicinity of the at least one winding, at least one second monomode optical fiber which forms at least one second winding in the vicinity of the at least one winding, said at least one second winding being arranged out of contact with the jacket in such a way so as not to be subjected to the mechanical stresses caused by the pressure of the strip on the jacket, said second optical fiber using the birefingerence in a monomode optical fiber under a temperature variation effect and delivering a signal representative of the temperature in the vicinity of the at least one winding of the first optical fiber.

11. A roller according to claim 10, wherein said second winding is housed in a channel machined on the cylindrical surface in the immediate vicinity of the at least one winding.

* * * * *